United States Patent [19]

Girguis

[11] 4,325,232
[45] Apr. 20, 1982

[54] CONSTANT VELOCITY UNIVERSAL JOINT

[75] Inventor: Sobhy L. Girguis, Troisdorf-Oberlar, Fed. Rep. of Germany

[73] Assignee: Uni-Cardan AG, Siegburg, Fed. Rep. of Germany

[21] Appl. No.: 69,369

[22] Filed: Aug. 24, 1979

[30] Foreign Application Priority Data

Aug. 26, 1978 [DE] Fed. Rep. of Germany ....... 2837301

[51] Int. Cl.³ .............................................. F16D 3/30
[52] U.S. Cl. .............................................. 64/21; 64/8
[58] Field of Search ................................... 64/21, 7, 8

[56] References Cited

U.S. PATENT DOCUMENTS

| | | | |
|---|---|---|---|
| 1,975,758 | 10/1934 | Stuber | 64/21 |
| 3,324,682 | 6/1967 | Bendler | 64/21 |
| 3,541,809 | 11/1970 | Howey | 64/21 |
| 3,928,985 | 12/1975 | Girguis | 64/21 |
| 4,054,038 | 10/1977 | Takahashi et al. | 64/21 |
| 4,129,345 | 12/1978 | Krude | 64/21 |

Primary Examiner—Ira S. Lazarus
Assistant Examiner—Magdalen Moy
Attorney, Agent, or Firm—Toren, McGeady & Stanger

[57] ABSTRACT

In a constant velocity universal joint, an inner joint body is inserted into a hollow outer joint body. A cage is positioned between the inner and outer joint bodies and balls held in windows in the cage extend into grooves formed in the facing surfaces of the inner and outer joint bodies. The centers of the balls are located in a plane which bisects the angle between the axis of the inner and outer joint bodies when the universal joint is bent. The windows in the cage have two boundary surfaces extending parallel to the plane containing the centers of the balls. One of the two boundary surfaces includes a bevelled face extending outwardly to the outer surface of the cage. The prolongation of the bevelled surface intersects the plane containing the centers of the balls.

5 Claims, 9 Drawing Figures

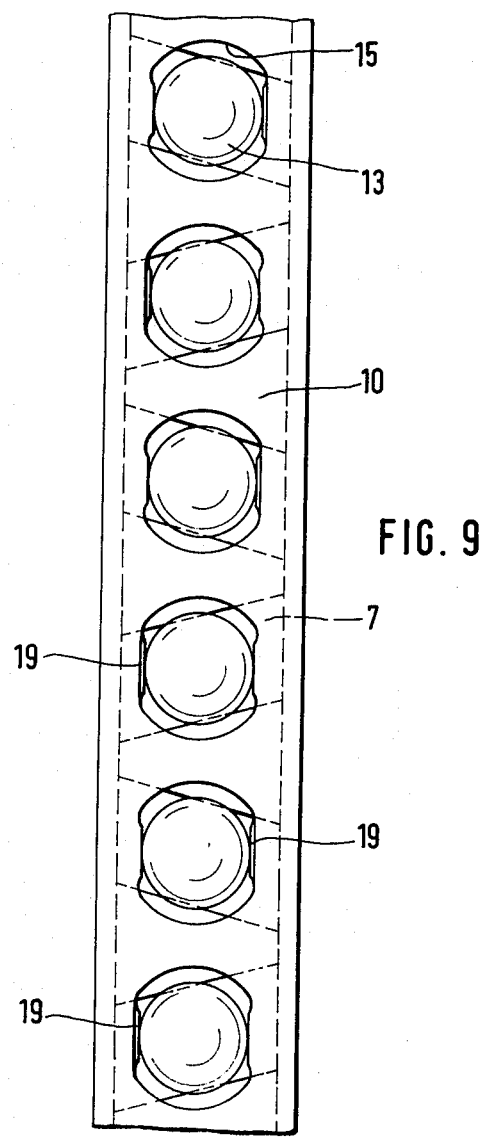

CONSTANT VELOCITY UNIVERSAL JOINT

SUMMARY OF THE INVENTION

The present invention is directed to a constant velocity universal joint having a hollow outer joint body with grooves formed in its inner surface. An inner joint body extends into the outer joint body and its outer wall has a number of grooves corresponding to the grooves in the inner surface of the outer joint body. Each pair of grooves contains a ball for transmitting torque between the inner and outer joint bodies. The balls are guided in openings or windows in a cage positioned between the inner and outer joint bodies. The centers of the balls lie in a plane which bisects the angle between the axes of the inner and outer joint bodies when the universal joint is bent. Each window in the cage has a pair of boundary surfaces extending substantially parallel to and spaced outwardly from the plane containing the centers of the balls. One of the boundary surfaces serves as a contact or abutment surface for the ball under torque load.

There are known joints, note U.S. Pat. No. 1,975,758, where a cage is provided with windows with the outer ends of the boundary surfaces facing the outer joint body being chamfered, however, the chamfered configuration of the boundary surface is not involved in the operation of the joint. Such chamfers merely serve to prevent the edges from being warped by the balls when the joint is being used.

The primary object of the present invention is to reduce to a minimum the wall thickness of the cage used in a constant velocity universal joint so that the contact between the balls and the bearing surfaces in the cage is maintained even at the greatest possible displacement of the ball and at the maximum bending angle of the joint. Further, the arrangement of the bearing surface in the window of the cage is arranged to ensure the return of the balls from the displaced position without any jamming or wedging between the edge of the cage and the adjacent surface of the outer joint member.

In accordance with the present invention, the bearing surface is provided with an inclined or bevelled face which interconnects the radially outer end of the bearing surface to the outer surface of the cage which outer surface is guided by or in contact with the inner surface of the outer joint body. The prolongation of the bevelled face toward the ball contacting the bearing surface intersects the plane containing the centers of the ball in the direction inwardly toward the center of the universal joint. It is advantageous if the wall thickness of the cage can be dimensioned without regard to the bearing surface which must be provided for the ball. Accordingly, the wall thickness of the cage is dimensioned as required by load conditions.

Furthermore, it is advantageous if the edge load on the cage is eliminated by the balls so that no harmful warping occurs at the edge which would increase the risk of jamming the cage within the outer joint body. Even in the extreme radially outward displacement of the balls, the balls are readily returned to their normal positions by way of the bevelled face, so that there are no alterations in the kinetic conditions of the joint.

Another feature of the invention is that the angle formed by the bevelled face and the bearing surface corresponds substantially to the angle formed between two lines with one of the lines extending from the intersection of the bevelled face and the bearing surface to a point of maximum radial displacement of the ball in the plane of the balls and another line extending from the point of intersection of the bevelled face and bearing surface to a point of radial deflection of the ball corresponding to the minimum thickness of the cage.

It is advantageous that the radial deflection of the ball under torque load and maximum bending of the joint is taken into account in dimensioning the bevelled face with the angle of the bevelled face relative to the bearing surface being selected so that the balls in any position are in constant contact with the surfaces defining the windows in the cage.

In joints where the ball grooves are parallel with the axis of the joint, a cage is required for steering or controlling the balls in the plane which bisects the angle formed by the axes of the outer joint body and inner joint body and takes over the steering action, since the ball grooves themselves are not capable of such controlling action. Another feature of the invention where the cage has an outer spherical surface guided on the inner surface of the outer joint body and an inner spherical surface guided on the outer surface of the inner joint body, the center of the spherical outer and inner surfaces on the cage are arranged in different planes spaced on opposite sides of the plane containing the centers of the balls and the bevelled face is provided on the boundary surface of the cage windows adjacent that portion of the cage which has the least wall thickness.

In joints with such parallel ball grooves another boundary surface of the cage window can be provided with a bevelled face which extends from the inner surface of the cage outwardly to the bearing surface so that the prolongation of the bevelled face intersects the plane containing the centers of the balls in the direction outwardly away from the center of the universal joint.

In another embodiment where the grooves extend in meridian planes and where the grooves in the inner and outer joint bodies intersect in such a way that they form a mouth-shaped opening on one end, the bevelled faces are correlated with the bearing surfaces in the cage windows so that the bevelled surface is closer to the ends of the grooves forming the mouth-shaped opening.

In still another embodiment the grooves formed in the different parts of the joint are arranged so that adjacent grooves extend in a V-shaped arrangement and the bevelled faces are associated with the bearing face surfaces of the cage windows with the bearing surface facing in the direction in which the grooves in the outer joint body are spaced the greater distance apart.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 9 is a developed view of a cage such as used in the joint represented in FIG. 6.

DETAILED DESCRIPTION OF THE INVENTION

Figure 1:
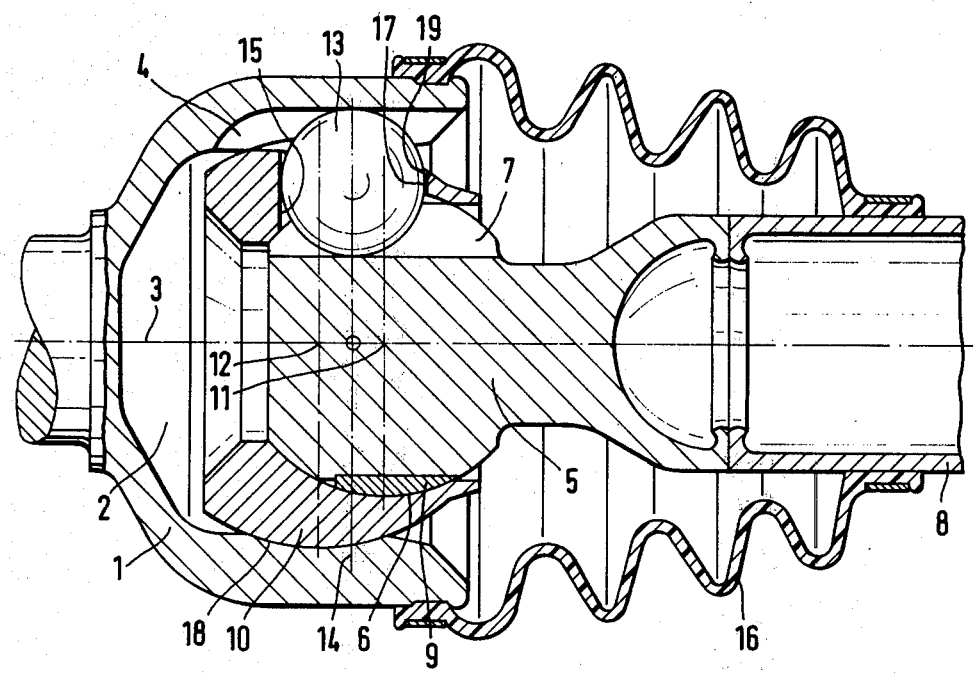
FIG. 1 is a cross sectional view through the axis of a constant velocity universal joint where the cage is guided on a special control device embodying the present invention.

In FIG. 1 a constant velocity universal joint is illustrated and includes a hollow joint body 1 with its inner surface defining a cavity 2. Grooves 4 are formed in the inner surface of the outer joint body 1 and extend parallel to the axis of rotation 3 of the joint. An inner joint body 5 extends into the cavity 2 in the outer joint body and the outer surface of the inner joint body has longitudinally extending grooves 7 extending in the same general direction as the grooves 4. The inner joint body 5 is formed integrally with drive shaft 8. As viewed in FIG. 1 the axes of the outer joint body 1 and the inner joint body 5 are in alignment. When the constant velocity universal joint is bent, however, the axes are disposed angularly relative to one another. A control body 9 is located on the outer surface of the inner joint body and has an outer ball surface 6. A cage 10 has a spherically shaped inner surface supported on and in contact with the ball surface 6 of the control body. The cage has a spherically shaped outer surface which is in contact with the inner surface of the outer joint body 1. The inner spherical surface of the cage has a center 11 and the outer spherical surface of the cage has a center 12 and these two centers are each located on an opposite side of the plane 14 containing the centers of the balls or torque transmission elements 13. The plane 14 bisects the angle between the axes of the outer and inner joint bodies when the universal joint is bent.

Windows 15 are spaced apart around the circumference of the cage 10 and the balls 13 are held in the windows for effecting torque transmission. Accordingly, each ball extends from a groove 4 in the outer joint body 1 through a window 15 in the cage 10 into a groove 7 in the inner joint body 5. A bellows 16 extending between the outer surface of the outer joint body 1 and the outer surface of the drive shaft 8 provides a sealed closure for the cavity 2.

Each window 15 of cage 10 has four lateral faces and two of these faces spaced apart in the axial direction of the universal joint serve as boundary surfaces for the balls 13. Under operating conditions, the balls 13 transmit torque and bear against the boundary surface 17 in the window 15, note FIG. 1. The bearing surface 17 extends from the inner surface of the cage toward the outer surface 18 of the cage 10, however, a bevelled face 19 extends from the radially outer end of the bearing surface 17 to the outer surface 18. The bearing surface 17 and the bevelled face 19 are located on the side of the window 15 adjacent the portion of the cage having the least wall thickness.

Figure 2:
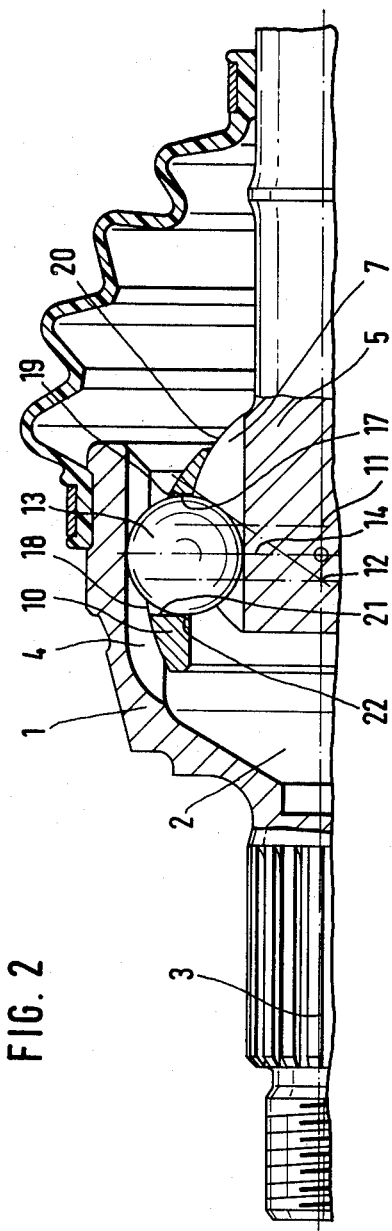
FIG. 2 is a sectional view similar to that shown in FIG. 1 with the cage guided directly on the inner joint part.

In FIG. 2 another constant velocity universal joint is illustrated including a hollow joint body 1 having a cavity 2. Grooves 4 are formed within the inner surface of the outer joint body 1 which defines the cavity 2 and the joints extend parallel to the axis of rotation 3 of the universal joint. An inner joint body 5 is located in the cavity 2 and has a spherical or ball outer surface 20 in which longitudinally extending grooves 7 are formed. The grooves 7 extend in generally the same direction as the grooves 4. A cage 10 is located in the cavity 2 between the inner surface of the outer joint body and the outer surface of the inner joint body. Cage 10 has a ball shaped inner surface in contact with the ball surface 20 on the inner joint body. Further, cage 10 has a spherical outer surface. Plane 14 contains the centers of the balls 13 which transmit torque between the outer and inner joint bodies. The center 11 for the inner spherical surface of the cage 10 and the center 12 for the outer spherical surface of the cage 10 are located on the opposite sides of the plane 14 containing the centers of the torque transmission elements 13. Cage 10 also has windows 15 spaced apart on its circumference in which the balls are secured for effecting torque transmission between the outer and inner joint bodies. Accordingly, each ball extends from a groove 4 in the inner surface of the outer joint body 1 through a window 15 in the cage 10 into a corresponding joint 7 in the outer surface of the inner joint body 5.

In the embodiment of FIG. 2 the bearing surface 17 for the ball 13 is on the side of the window 15 located closest to the end of the cage having the least wall thickness. The bearing surface 17 extends from the inner surface of the cage toward its outer surface, however, a bevelled face 19 interconnects the radially outer end of the bearing surface 17 with the outer surface 18 of the cage. In addition, the opposite boundary surface of the window 15 from the bearing surface 17 affords another bearing surface 21 having a bevelled face 22 extending between the radially inner end of the surface 21 and the inner surface of the cage.

Figure 3:
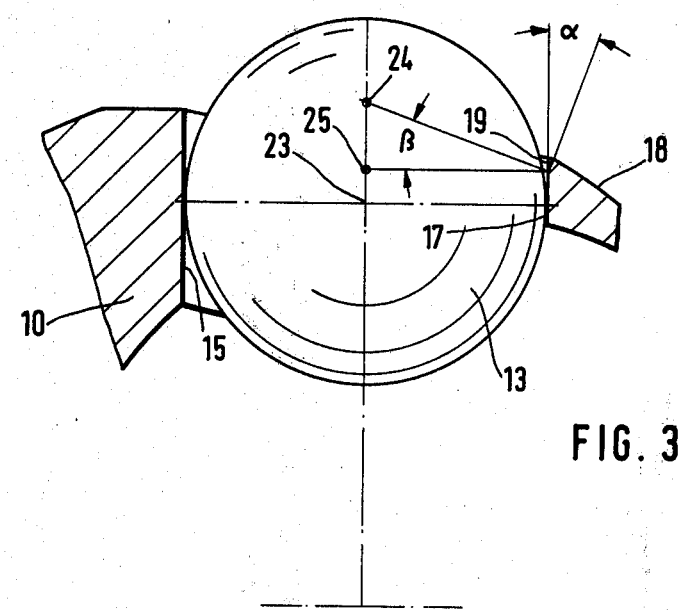
FIG. 3 is an enlarged detail view of a portion of the joint illustrated in FIG. 1.

In FIG. 3 an enlarged detail view of FIG. 1 is provided. A portion of cage 10 is illustrated containing the window 15 in which the ball or torque transmission element 13 is held. On the side or end of the cage 10 having the least wall thickness the bearing surface 17 extends from the inner surface of the cage toward the outer surface, however, a bevelled face 19 interconnects the radially outer end of the bearing surface 17 with the outer surface 18 of the cage. As shown, the bevelled face 19 forms an angle $\alpha$ with the bearing surface 17 which is substantially equal to angle $\beta$. Angle $\beta$ is defined by one line extending from the intersection of the bevelled face 19 with the bearing surface 17 and the point 24 in the plane 14 which represents the maximum radial deflection of the ball center 23 when the universal joint is bent. The outer line forming the angle extends between the intersection of the bevelled face 19 and the bearing surface 17 and the point 25 in the plane 14 where the ball center 23 has been radially displaced outwardly so that it is just in contact with the bearing surface 17. This radial displacement of the ball 13 corresponds to the minimum or least thickness of the cage 10.

Figure 4:
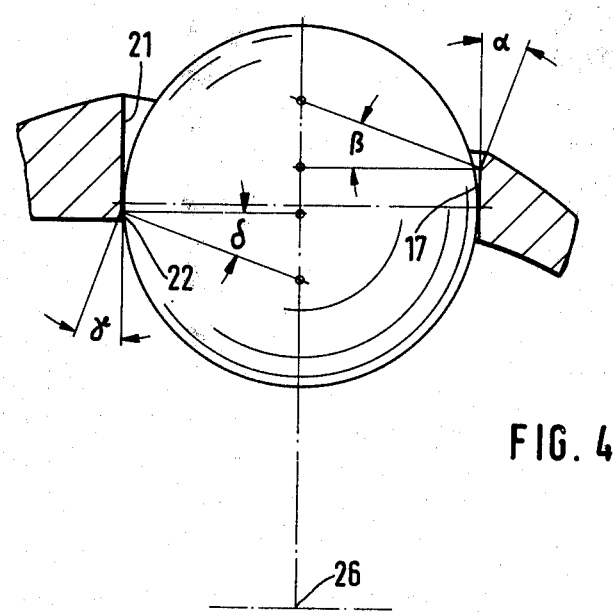
FIG. 4 is an enlarged detail view of a portion of the joint illustrated in FIG. 2.

FIG. 4 is similar to FIG. 3 having the same angles $\alpha$ and $\beta$, however, the bearing surface 21 opposite bearing surface 17 has a bevelled face 22 which extends at an angle $\gamma$ relative to the bearing surface 21.

Figure 5:
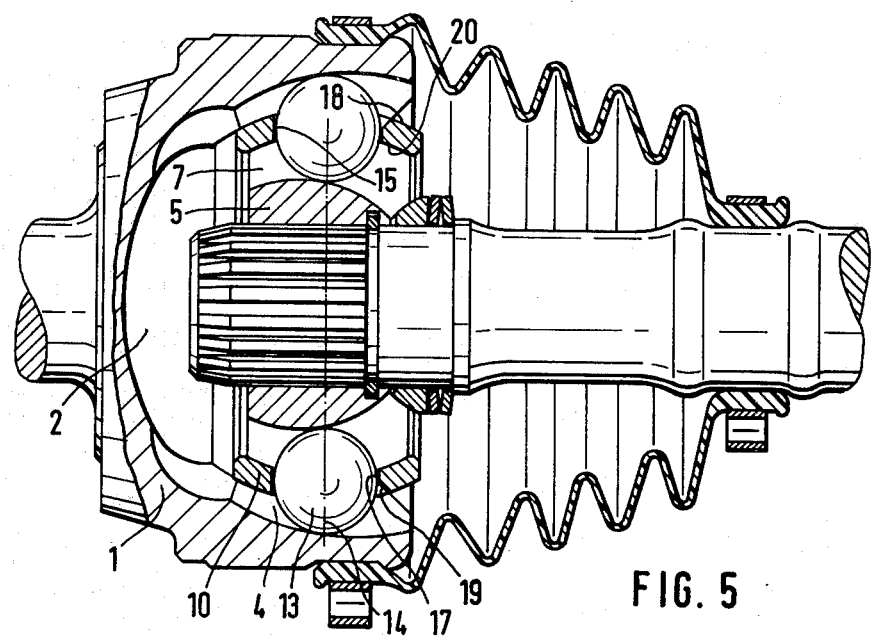
FIG. 5 is a cross sectional view of a universal joint embodying the present invention where the ball grooves diverge and form a mouth-like opening at one end.

In FIG. 5 another constant velocity universal joint is illustrated including an outer joint body 1 having grooves 4 formed in its inner surface defining the cavity 2. An inner joint body 5 is located within the cavity 2 and is provided with grooves 7 in its outer wall facing toward the grooves 4 in the outer joint body 1. A ball 13 is located within a pair of opposed grooves 4 and 7 with a cage 10 located between the outer joint body 1 and the inner joint body 5 with windows 15 in the cage holding the balls. Ball grooves 4 and 7 extend in meridian planes with regard to the axis of the joint body in which the grooves are formed. A pair of opposed grooves 4, 7 form a mouth-shaped opening for the balls for controlling or steering them in the plane 14 containing the centers of the balls located within the windows in the cage 10. The spherically shaped cage 10 serves to hold the balls 13 guided in the joint as shown in FIG. 5 with the inner surface of the cage bearing on the outer surface 20 of the inner joint body 5 and the outer surface 18 of the cage bearing against the spherically shaped inner surface defining the cavity 2 in the outer joint body 1.

In this embodiment, the balls contact a bearing surface 17 in the window which is interconnected to the outer surface of the cage by a bevelled face 19. The bearing surface 17 along with the bevelled face 19 are located on the side of the cage which has the widest mouth or greatest opening between the pair of opposed grooves 4, 7.

Figure 6:
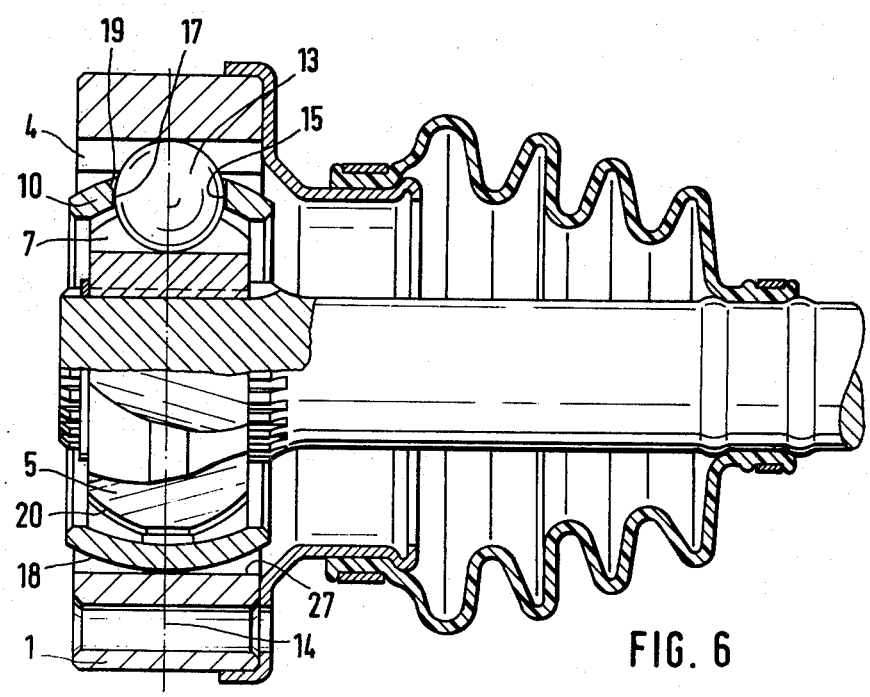
FIG. 6 is a cross sectional view of a joint embodying the present invention in which displacement is possible between the parts of the joint and utilizing intersecting ball grooves.

In FIG. 6, the illustrated constant velocity universal joint affords relative axial displacement between said outer joint body 1 and said inner joint body 5. The inner surface of said outer joint body forms a cylindrical bore 27 into which the inner joint body is inserted. Balls 13 are received in oppositely disposed grooves 4, 7 of the outer and inner joint bodies 1, 5, respectively. Cage 10 has windows 15 spaced apart around its circumference in which the balls 13 are held.

In this embodiment the grooves 4 and 7 of the outer and inner joint bodies 1, 5, respectively, extend obliquely to the axis of the joint body in which they are formed. The grooves 4, 7 are arranged so that they extend across one another. Cage 7 has a spherical outer surface 18 shown in contact with the surface of the cylindrical bore 27 formed by the outer joint member, however, the inner surface of the cage is spaced from the outer surface 20 of the inner joint body to ensure displacement of the inner joint body 5 relative to the outer joint body 1. The combination of the crossing or intersecting grooves 4, 7 and the cage 10 assure that the balls 13 are guided in the homokinetic plane 14, that is the plane containing the centers of the balls 13, which plane bisects the angle between the axes of the outer and inner joint bodies 1, 5 when the universal joint is bent.

As can be noted in FIG. 6, cage window 15 has a bearing surface 17 with a bevelled face 19 extending from the bearing surface to the outer surface of the cage.

Figure 7:
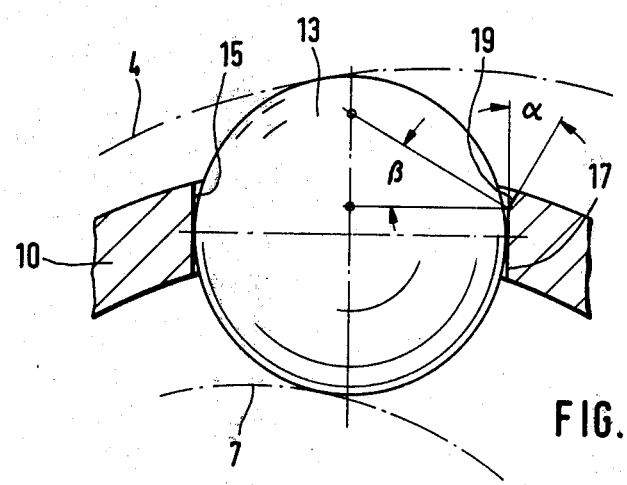
FIG. 7 is an enlarged detail view of a portion of the joint shown in FIG. 5.

FIG. 7 is an enlarged detail view of a portion of FIG. 5. Groove 4 of the outer joint body 1 and groove 7 of the inner joint body 5 are represented schematically by dot-dash lines. Ball 13 is held in a window 15 of the cage 10 and the bearing surface 17 on one side of the ball includes a bevelled face 19 extending from the bearing surface to the outer surface of the cage. The bearing surface 17 and bevelled face 19 are located on the side of the window closest to the end of the grooves having the largest mouth-shaped cross section. The bevelled face 19 forms an angle $\alpha$ with the bearing surface 17 and this angle corresponds to the angle $\alpha$ shown in FIGS. 3 and 4.

Figure 8:
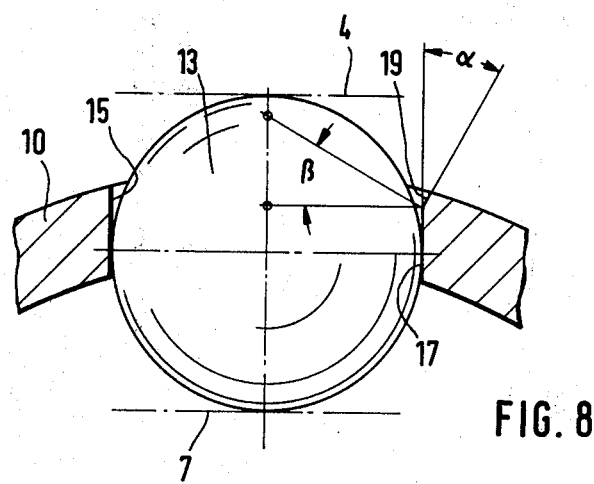
FIG. 8 is an enlarged detail view of a portion of the joint displayed in FIG. 6.

In FIG. 8 an enlarged detail is shown of a portion of FIG. 6 with a ball 13 held in a window 15 of the cage 10. The groove 4 of the outer joint body 1 and the groove 7 of the inner joint body 5 is represented schematically by dot-dash lines. In this embodiment the window 15 of the cage 10 has a bearing surface 17 and a bevelled face 19. The bevelled face forms an angle $\alpha$ with the bearing surface. The embodiment in FIG. 8 does not differ in principle from that in FIG. 7.

In FIG. 9, a cage 10 is shown developed and includes six cage windows 15 in which the balls 13 are held. Grooves 7 of the inner joint body 5 are shown in dashed lines and the grooves are shown inclined to the center axis of the joint body in which they are formed. The angular orientation of adjacent grooves 7 is alternated so that they are inclined relative to one another providing a V-shaped appearance. Bevelled faces 19 in combination with the bearing surfaces are arranged on opposite sides of the windows 15 in adjacent windows. This arrangement is preferred where the direction of rotation during operation is primarily in one direction.

In joints of this type, where the rotation direction changes frequently, the bevelled faces 19 can be located on opposite sides of the windows as viewed in the axial direction, since the balls are constantly changing from one bearing surface to the other under torque load.

While specific embodiments of the invention have been shown and described in detail to illustrate the application of the inventive principles, it will be understood that the invention may be embodied otherwise without departing from such principles.

What is claimed is:

1. Constant velocity universal joint, comprising a hollow outer joint body having an inner surface defining a hollow interior and with the inner surface encircling the axis of said outer joint body and the inner surface having spaced grooves therein extending generally in the axial direction of said outer joint body, an inner joint body located within the hollow interior of said outer joint body and having an outer surface speed inwardly from the inner surface of said outer joint body, said inner joint body having an axis alignable with the axis of said outer joint body and said axes being angularly displaceable one relative to the other when the universal joint is angularly displaced from the aligned arrangement of the axes of said outer and inner joint bodies, said outer surface of said inner joint body having a number of grooves therein corresponding in number to the grooves in said joint body and extending generally in the axial direction of said inner joint body, a plurality of balls located between said outer and inner joint bodies with each said ball positioned in one of said grooves in said outer joint body and in a corresponding groove in said inner joint body for transmitting torque between said outer and inner joint bodies, a cage located within said outer joint body and between the inner surface of said outer joint body and the outer surface of said inner joint body, said cage having window openings therethrough with each said ball located in one of said window openings between the corresponding grooves, the centers of said balls being located in a plane which bisects the angle between the axes of said outer and inner joint bodies when the axes are angularly displaced out of alignment, each of said windows having a pair of opposed boundary surfaces spaced from and disposed parallel to the plane containing the centers of said balls and said pair of opposed boundary surfaces comprising a first boundary surface and a second boundary surface, and said first boundary surface serving under torque load as a bearing surface for said ball wherein the improvement comprises that said first boundary surface has a bevelled face extending outwardly from said first boundary surface to said outer surface of said cage, the prolongation of said bevelled face intersecting the plane containing the centers of said balls at a location spaced inwardly from the center of said ball within said window containing said bevelled face, said cage having an outer surface in contact with the inner surface of said outer joint body and an inner joint body, the outer surface and inner surface of said cage being spherically shaped and the center of the spherically shaped outer surface being located on one side of the plane of said balls and the center of the spherically shaped inner surface being located on the opposite side of the plane of said balls from the center of the outer surface so that said cage has a decreasing thickness in the axial direction of said outer and inner joint bodies in the direction extending from the second boundary surface toward the first boundary surface the bevelled face being located on the first boundary surface of said window adjacent the end of said cage having the least wall thickness and the second boundary surface has a greater thickness than the first boundary surface and extends outwardly to the outer surface of said cage.

2. Constant velocity universal joint, as set forth in claim 1, wherein the angle formed between said bevelled face and the plane containing the centers of said balls is substantially equal to the angle formed between the line extending from the intersection of said bevelled surface and said first boundary surface to the point of maximum radial displacement of said balls outwardly from the axes of said outer and inner joint bodies when said universal joint is bent and the line extending between the intersection of said bevelled face and said first boundary surface and the point of radially outward displacement of said balls equal to the minimum thickness of said cage.

3. Constant velocity universal joint comprising a hollow outer joint having an inner surface defining a hollow interior and with the inner surface encircling the axis of said outer joint body and the inner surface having spaced grooves therein extending generally in the axial direction of said outer joint body, an inner joint body located within the hollow interior of said outer joint body and having an outer surface spaced inwardly from the inner surface of said outer joint body, said inner joint body having an axis alignable with the axis of said outer joint body and said axes being angularly displaceable one relative to the other when the universal joint is angularly displaced from the aligned arrangement of the axes of said outer and inner joint bodies, said outer surface of said inner joint body having a number of grooves therein corresponding in number to the grooves in said body and extending generally in the axial direction of said inner joint body, a plurality of balls located between said outer and inner joint bodies with each said ball positioned in one of said grooves in said outer joint body and in a corresponding groove in said inner joint body for transmitting torque between said outer and inner joint bodies, a cage located within said outer joint body and between the inner surface of said outer joint body and the outer surface of said inner joint body, said cage having window openings therethrough with each said ball located in one of said window openings between the corresponding grooves, the centers of said balls being located in a plane which bisects the angle between the axes of said outer and inner joint bodies when the axes are angularly displaced out of alignment, each of said windows having a pair of opposed boundary surfaces spaced from and disposed parallel to the plane containing the centers of said balls and said pair of opposed boundary surfaces comprising a first boundary surface and a second boundary surface, and said first boundary surface serving under torque load as a bearing surface for said ball wherein the improvement comprises that said first boundary surface has a bevelled face extending outwardly from said first boundary surface to said outer surface of said cage, the prolongation of said bevelled face intersecting the plane containing the centers of said balls at a location spaced inwardly from the center of said ball within said window containing said bevelled face, said cage having an outer surface in contact with the inner surface of said outer joint body and an inner surface in contact with the outer surface of said inner joint body, the outer surface and inner surface of said cage being spherically shaped and the center of the spherically shaped outer surface being located on one side of the plane of said balls and the center of the spherically shaped inner surface being located on the opposite side of the plane of said balls from the center of the outer surface, and the bevelled face being located on the boundary surface of said window adjacent the end of said cage having the least wall thickness, said second boundary surface having a bevelled face extending from the end of said second boundary surface closer to the inner surface of said cage to the inner surface of said cage, and the prolongation of said bevelled surface on said second boundary surface intersecting the plane of said balls in the direction outwardly away from the axes of said outer and inner joint bodies.

4. Constant velocity universal joint comprising a hollow outer joint body having an inner surface defining a hollow interior and with the inner surface encircling the axis of said outer joint body and the inner surface having spaced grooves therein extending generally in the axial direction of said outer joint body, an inner joint body located within the hollow interior of said outer joint body and having an outer surface spaced inwardly from the inner surface of said outer joint body, said inner joint body having an axis alignable with the axis of said outer joint body and said axes being angularly displaceable one relative to the other when the universal joint is angularly displaced from the aligned arrangement of the axes of said outer and inner joint bodies, said outer surface of said inner joint body having a number of grooves therein corresponding in number to the grooves in said joint body and extending generally in the axial direction of said inner joint body, a plurality of balls located between said outer and inner joint bodies with each said ball positioned in one of said grooves in said outer joint body and in a corresponding groove in said inner joint body for transmitting torque between said outer and inner joint bodies, a cage located within said outer joint body and between the inner surface of said outer joint body and the outer surface of said inner joint body, said cage having window openings therethrough with each said ball located in one of said window openings between the corresponding grooves, the centers of said balls being located in a plane which bisects the angle between the axes of said outer and inner joint bodies when the axes are angularly displaced out of alignment, each of said windows having a pair of opposed boundary surfaces spaced from and disposed parallel to the plane containing the centers of said balls and said pair of opposed boundary surfaces comprising a first boundary surface and a second boundary surface, and said first boundary surface serving under torque load as a bearing surface for said ball wherein the improvement comprises that said first boundary surfaces has a bevelled face extending outwardly from said first boundary surface to said outer surface of said cage, the prolongation of said bevelled face intersecting the plane containing the centers of said balls at a location spaced inwardly from the center of said ball within said window containing said bevelled face, said cage having an outer surface in contact with the inner surface of said outer joint and an inner surface in contact with the outer surface of said inner joint, the outer surface and inner surface of said cage being spherically shaped and the outer surface and inner surface of said cage having a common center, said grooves in said inner and outer joint bodies extend in meridian planes relative to the respective joint body and said inner and outer joint bodies arranged relative to one another so that said grooves diverge from one another whereby a mouth-shaped opening is formed at one end of said grooves, and the bevelled faces combined with said boundary surfaces in the windows of said cage are located at the side of said windows closer to the mouth-shaped opening of said grooves.

5. Constant velocity universal joint comprising a hollow outer joint body having an inner surface defining a hollow interior and with the inner surface encircling the axis of said outer joint body and the inner surface having spaced grooves therein extending generally in the axial direction of said outer joint body, an inner joint body located within the hollow interior of said outer joint body and having an outer surface spaced inwardly from the inner surface of said outer joint body, said inner joint body having an axis alignable with the axis of said outer joint body and said axes being angularly displaceable one relative to the other when the universal joint is angularly displaced from the aligned arrangement of the axes of said outer and inner joint bodies, said outer surface of said inner joint body having a number of grooves therein corresponding in number to the grooves in said outer joint body and extending generally in the axial direction of said inner joint body, a plurality of balls located between said outer and inner joint bodies with each said ball positioned in one of said grooves in said outer joint body and in a corresponding groove in said inner joint body for transmitting torque between said outer and inner joint bodies, a cage located within said outer joint body and between the inner surface of said outer joint body and the outer surface of said inner joint body, said cage having window openings therethrough with each said ball located in one of said window openings between the corresponding grooves, the centers of said balls being located in a plane which bisects the angle between the axes of said outer and inner joint bodies when the axes are angularly displaced out of alignment, each of said windows having a pair of opposed boundary surfaces spaced from and disposed parallel to the plane containing the centers of said balls and said pair of opposed boundary surfaces comprising a first boundary surface and a second boundary surface, and said first boundary surface serving under torque load as a bearing surface for said ball wherein the improvement comprises that said first boundary surface has a bevelled face extending outwardly from said first boundary surface to said outer surface of said cage, the prolongation of said bevelled face intersecting the plane containing the centers of said balls at a location spaced inwardly from the center of said ball within said window containing said bevelled face, wherein adjacent said grooves in said outer joint body are disposed in a V-shaped form and said bevelled faces combined with said boundary surfaces are located on the sides of said windows of said cage adjacent the ends of said grooves which are spaced further apart.

* * * * *